United States Patent
Banerjee et al.

(10) Patent No.: US 8,527,131 B2
(45) Date of Patent: Sep. 3, 2013

(54) METHOD FOR OPERATING A DRIVETRAIN

(75) Inventors: Alexander Banerjee, Oberteuringen (DE); Notker Amann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/392,910

(22) PCT Filed: Aug. 31, 2010

(86) PCT No.: PCT/EP2010/062701
§ 371 (c)(1),
(2), (4) Date: Feb. 28, 2012

(87) PCT Pub. No.: WO2011/026832
PCT Pub. Date: Mar. 10, 2011

(65) Prior Publication Data
US 2012/0158232 A1 Jun. 21, 2012

(30) Foreign Application Priority Data
Sep. 2, 2009 (DE) .......................... 10 2009 029 119

(51) Int. Cl.
*B60L 11/00* (2006.01)
*B60K 6/20* (2007.10)
*F16H 37/00* (2006.01)

(52) U.S. Cl.
USPC ............................... 701/22; 180/65.21; 74/11

(58) Field of Classification Search
USPC ............. 701/22, 29, 34; 180/65.2, 65.1–65.8
See application file for complete search history.

(56) References Cited

U.S. PATENT DOCUMENTS

| | | | |
|---|---|---|---|
| 5,291,960 A * | 3/1994 | Brandenburg et al. | .... 180/65.27 |
| 5,345,761 A | 9/1994 | King et al. | |
| 7,445,065 B2 | 11/2008 | Sanchen | |
| 2002/0112489 A1 | 8/2002 | Egawa et al. | |
| 2003/0158639 A1* | 8/2003 | Nada | ............................... 701/29 |
| 2005/0284675 A1* | 12/2005 | Sanchen | ..................... 180/65.2 |
| 2006/0052215 A1 | 3/2006 | Beaty et al. | |
| 2008/0011005 A1 | 1/2008 | Obayashi et al. | |
| 2010/0186404 A1 | 7/2010 | Yasufuku et al. | |

FOREIGN PATENT DOCUMENTS

| | | |
|---|---|---|
| DE | 101 46 477 A1 | 2/2003 |
| DE | 10 2006 022 249 A1 | 11/2007 |
| DE | 10 2007 003 756 A1 | 7/2008 |
| JP | 2008-280178 A | 11/2008 |
| WO | 2004/000597 A1 | 12/2003 |
| WO | 2007/043953 A1 | 4/2007 |
| WO | 2008/100284 A2 | 8/2008 |

\* cited by examiner

*Primary Examiner* — Muhammad Shafi
(74) *Attorney, Agent, or Firm* — Davis & Bujold, PLLC

(57) ABSTRACT

A method of operating a drive-train of a motor vehicle having a hybrid drive with an internal combustion engine and an electric machine, an electrical energy accumulator that can be charged when the electric machine operates as a generator and discharged when the electric machine operates as a motor, a transmission connected between the hybrid drive and a drive output, and at least one auxiliary power takeoff on either the transmission or the hybrid drive side such that the auxiliary power takeoff can be operated with variable energy demand within functional capability limits that depend on the auxiliary power takeoff. Depending on the current operating status of the hybrid drive unit, the electrical energy accumulator and/or the auxiliary power takeoff, energy available in the drive-train, but not required at the drive output, can bypass the electrical energy accumulator and be stored in the auxiliary power takeoff.

9 Claims, 3 Drawing Sheets

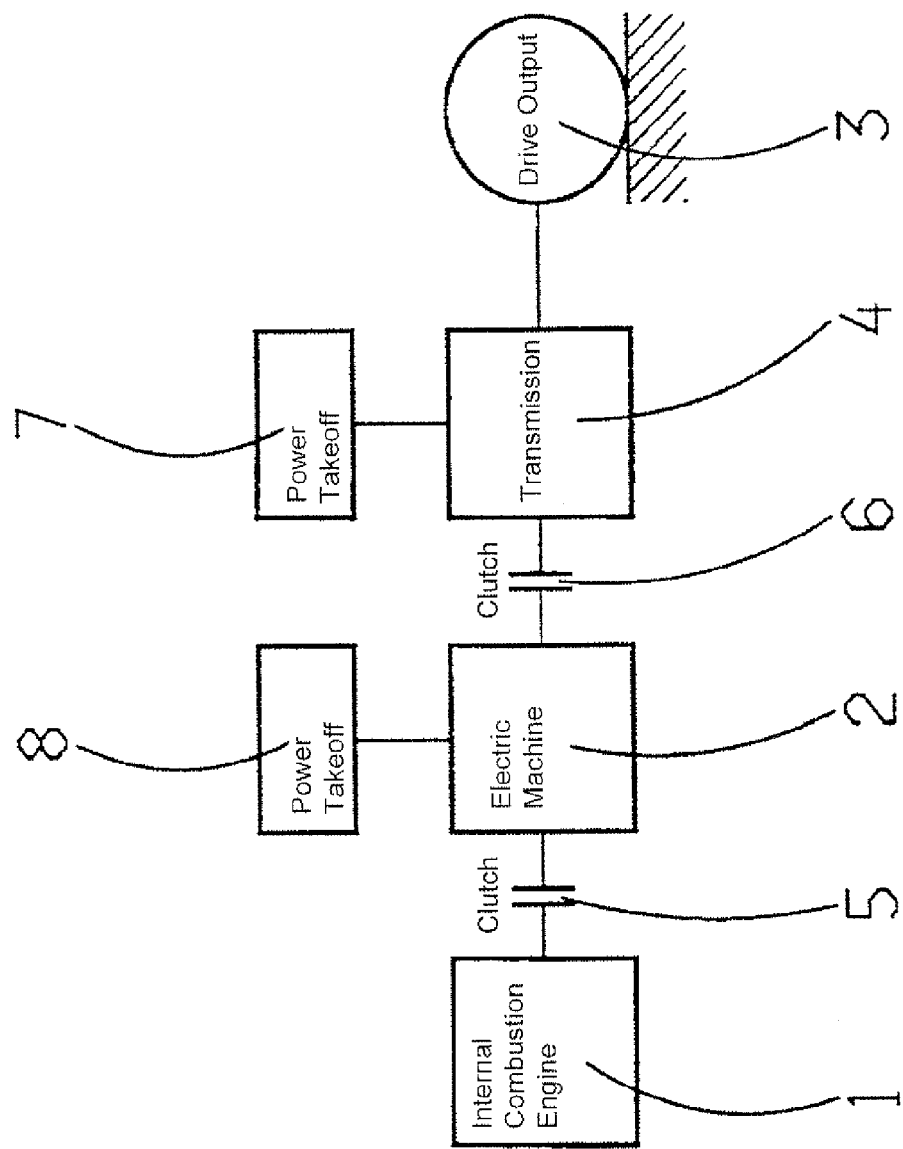

METHOD FOR OPERATING A DRIVETRAIN

This application is a National Stage completion of PCT/EP2010/062701 filed Aug. 31, 2012, which claims priority from German patent application serial no. 10 2009 029 119.9 filed Sep. 2, 2009.

FIELD OF THE INVENTION

The invention concerns a method for operating a drivetrain of a motor vehicle.

BACKGROUND OF THE INVENTION

The main components of a drive-train are a drive aggregate and a transmission. The transmission converts rotational speeds and torques, and transmits a traction force provided by the drive aggregate to a drive output of the drive-train. The present invention concerns a method for operating a drive-train having a drive aggregate in the form of a hybrid drive unit and at least one auxiliary power takeoff on the transmission side or on the drive aggregate side.

The hybrid drive unit of such a drive-train comprises an internal combustion engine and an electric machine, the electric machine of the hybrid drive unit can be operated as a generator or as a motor. When the electric machine of the hybrid drive unit is operating as a generator, an electrical energy accumulator of the drive-train is predominantly charged, and when the electric machine of the hybrid drive unit is operated as a motor the electrical energy accumulator of the drive-train is predominantly discharged.

An auxiliary drive, also known as an auxiliary power takeoff (PTO), draws power from the transmission side or from the drive aggregate side, this power then not being available at the drive output as traction force. An auxiliary power takeoff can be used, for example, for a cooling aggregate of a refrigerator vehicle or for a hydraulic press of a garbage disposal vehicle or for a hydraulically operated crane of a utility vehicle, or the like.

Until now it has been difficult to operate a drive-train with a hybrid drive unit and at least one auxiliary power takeoff in an efficient manner.

SUMMARY OF THE INVENTION

Starting from there, the present invention addresses the problem of providing a new type of method for operating a drive-train of a motor vehicle.

According to the invention, depending on the current operating status of the hybrid drive unit and/or depending on the current operating status of the electrical energy accumulator and/or depending on the current operating status of the auxiliary power takeoff, energy available in the drive-train but not required as traction force provided at the drive output bypasses the electrical energy accumulator and is stored in the auxiliary power takeoff.

The present invention makes possible the efficient operation of a drive-train with a drive aggregate in the form of a hybrid drive unit and with at least one auxiliary power takeoff. Depending on the current operating status of the hybrid drive unit and/or depending on the current operating status of the electrical energy accumulator and/or depending on the current operating status of the auxiliary power takeoff, energy or power available in the drive-train but not required as traction force at the drive output bypasses the electrical energy accumulator and is stored in the auxiliary power takeoff.

The advantage of bypassing the electrical energy accumulator is that the energy throughput through the same is smaller and the electrical energy accumulator can therefore be operated in a more protective manner. Furthermore, the storing of energy in the auxiliary power takeoff increases the energy storage capacity of the drive-train above and beyond the extent made possible by the electrical energy accumulator alone. So to speak, this is equivalent to a virtual enlargement of the storage capacity of the electrical energy accumulator.

BRIEF DESCRIPTION OF THE DRAWINGS

An example embodiment of the invention, to which it is not limited, is explained in more detail with reference to the drawing, which shows:

FIG. 1: An example of a drive-train layout in a motor vehicle, with which the method according to the invention can be used;

DETAILED DESCRIPTION OF THE PREFERRED EMBODIMENTS

Figure 1A:
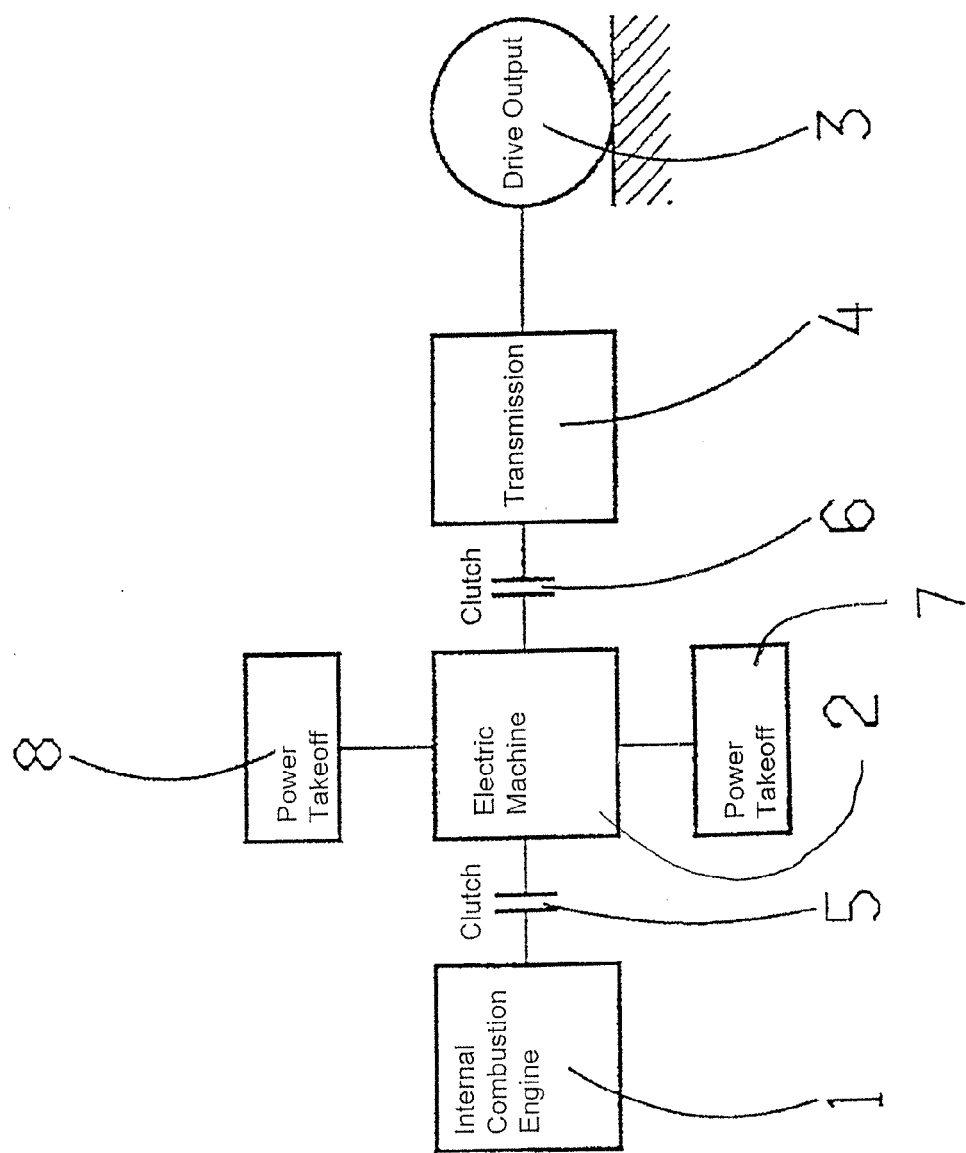
FIG. 1A: An example of a drive-train layout in a motor vehicle in which both power takeoffs are electrically driven.

The present invention concerns a method for operating a drive-train that comprises a hybrid drive unit and at least one auxiliary power takeoff. In a very schematic manner FIG. 1 shows a drive-train layout of a drive-train with which the method according to the invention can be used. Thus, the drive-train shown in FIG. 1 comprises a hybrid drive unit with an internal combustion engine 1 and an electric machine 2, and with a transmission 4 connected between the hybrid drive unit, namely its electric machine 2, and a drive output 3 of the drive-train. In the example embodiment shown, a clutch 5 can be connected between the internal combustion engine 1 and the electric machine 2. Also in the example embodiment shown, a clutch 6 is connected between the electric machine 2 and the transmission 4, such that the clutch 6 constitutes a starting element which can even be a transmission-internal clutch.

The drive-train of FIG. 1 also has two auxiliary power takeoffs, namely an auxiliary power takeoff 7 on the transmission side and an auxiliary power takeoff 8 on the drive aggregate side. The auxiliary power takeoff 7 on the transmission side draws power from the transmission 4, which is then not available at the drive output 3 as traction force. The auxiliary power takeoff 8 on the drive aggregate side draws power from the hybrid drive unit, namely from the electric machine 2 thereof.

Figure 2:
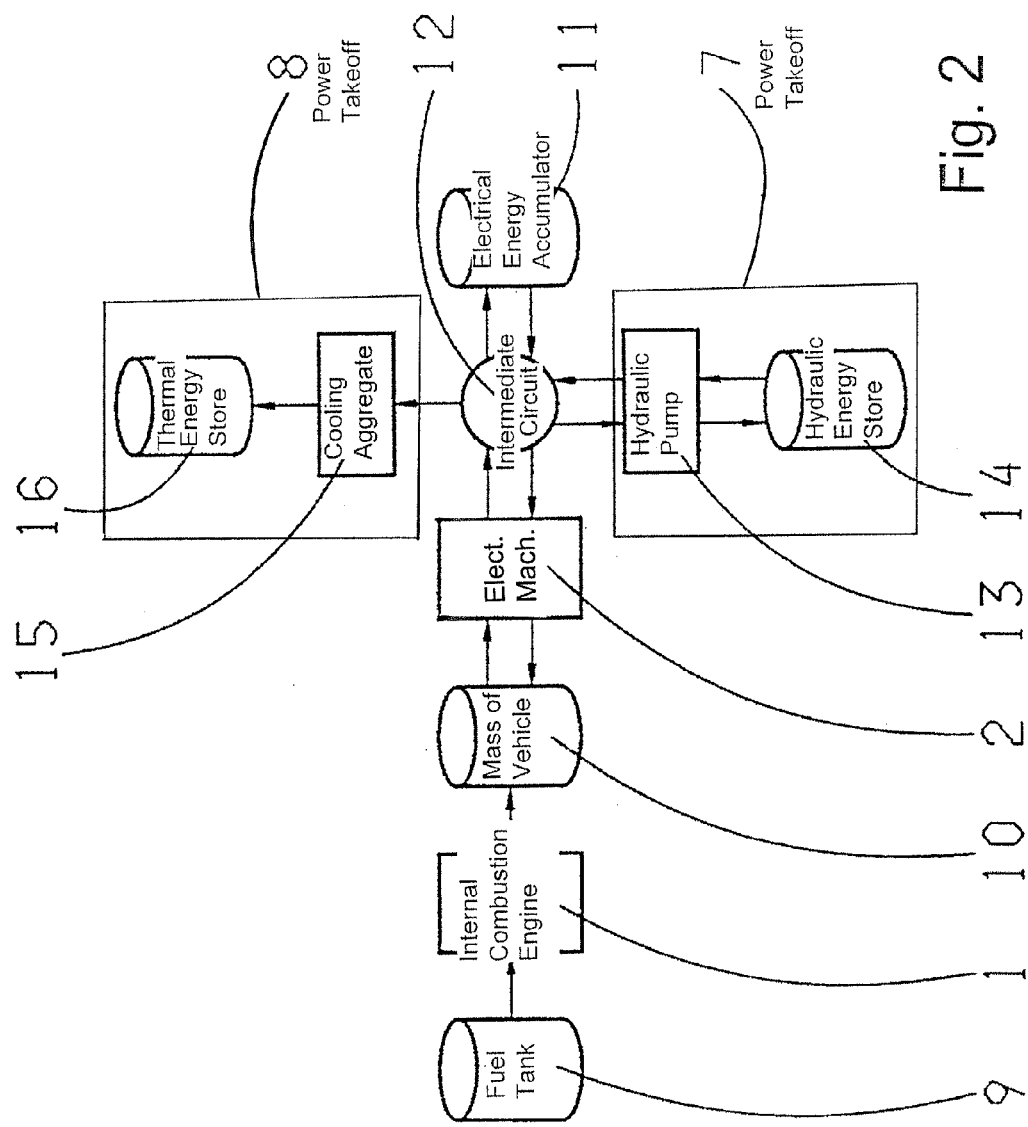
FIG. 2: A block diagram showing the electrical flow of the drive-train of FIG. 1A, to clarify the method according to the invention.

FIG. 2 shows another block diagram for the drive-train in FIG. 1A, such that in FIG. 2, besides the assemblies already mentioned, namely besides the internal combustion engine 1, the electric machine 2 and the two auxiliary power takeoffs 7 and 8, energy storage means are also shown. Thus, a fuel tank 9 of the drive-train holds fuel which is converted by the internal combustion engine 1 into kinetic energy of the motor vehicle, the mass 10 of the motor vehicle storing the kinetic energy thereof.

The kinetic energy of the vehicle's mass 10 can also be increased by the electric machine 2 of the hybrid drive unit, and when this is taking place the electric machine 2 predominantly discharges an electrical energy accumulator 11 of the drive-train. As shown in FIG. 2, between the electric machine 2 and the electrical energy accumulator 11 there is connected an electric intermediate circuit 12, which is designed as a direct-current intermediate circuit. As indicated by the arrows in FIG. 2, when the electric machine 2 is operating as a generator some kinetic energy derived from the vehicle's mass 10 can be converted into electrical energy for the predominant charging of the electrical energy accumulator 11, and the discharging and charging of the electrical energy accumulator 11 in each case take place by way of the electric intermediate circuit 12.

FIG. 2 also shows details of the auxiliary power takeoff 7 on the transmission side and of the auxiliary power takeoff 8 on the drive aggregate side. As an example, let it be assumed that the auxiliary power takeoff 7 on the transmission side is, for example, a hydraulically actuated auxiliary power takeoff, this hydraulically actuated auxiliary power takeoff 7 comprising an electrically powered hydraulic pump 13 supplied with electrical energy by the electric intermediate circuit 12, which can convert the electrical energy into hydraulic energy that can be stored in a hydraulic storage device 14 of the auxiliary power takeoff 7. The arrows in FIG. 2 also show that, conversely, the hydraulic energy can be converted into electrical energy.

The auxiliary power takeoff 8 on the drive aggregate side comprises, for example, a cooling aggregate 15 supplied with electrical energy by the electric intermediate circuit 12, the cooling aggregate 15 cooling a refrigeration chamber 16 of the drive-train, which also functions as a thermal energy store 16.

In the context of the present invention it is proposed to operate such a drive-train in such manner that, depending on the current operating status of the hybrid drive unit, namely depending on the current operating status of the internal combustion engine 1 and the electric machine 2 thereof, and/or depending on the current operating status of the electrical energy accumulator 11 and/or depending on the current operating status of the respective auxiliary power takeoff aggregate 7 or 8, energy available in the drive-train but not required in the form of traction force at the drive output 3 bypasses the electrical energy accumulator 11 and is stored in the auxiliary power takeoff 7 and/or 8.

Then, if as shown in FIG. 2 the auxiliary power takeoff 8 comprises a cooling aggregate 15 that serves to cool the refrigeration chamber 16, energy not required at the drive output 3 can bypass the electrical energy accumulator 11 and can be used by the cooling aggregate 15 for cooling the refrigeration chamber 16 to within admissible temperature limits thereof, in order in that way to store the energy not needed at the drive output in the refrigeration chamber 16 as thermal energy. For example, the refrigeration chamber can be operated without deterioration of its functionality within a defined, admissible temperature range, so that excess energy available in the drive-train but not required to contribute to the traction force can be used, while bypassing the electrical energy accumulator 11, to cool down the refrigeration chamber to within the admissible temperature range more effectively. The temperature limits are the functional capability limits of the refrigeration chamber 16 or cooling aggregate 15.

In the case of the hydraulically actuated auxiliary power takeoff 7 energy not needed at the drive output can again bypass the electrical energy accumulator 11 and be used, without functional deterioration, to increase a working pressure to within admissible pressure limits in the hydraulic storage device 14 of the auxiliary power takeoff 7. The pressure limits are the functional capability limits of the hydraulically actuated auxiliary power takeoff 7.

Likewise, if the auxiliary power takeoff 8 is a cooling fan that serves to cool the internal combustion engine 1, energy not needed at the drive output 3 can bypass the electrical energy accumulator 11 and be used by the cooling fan to cool down the internal combustion engine 1 to within admissible temperature limits, so that the energy not needed at the drive output 3 is used for thermal purposes to cool the internal combustion engine, namely as cooling power which is thermally stored in the mass of the internal combustion engine 1.

If the auxiliary power takeoff 8 is a heating aggregate that serves to warm up an internal combustion engine 1, energy not needed at the drive output 3 can bypass the electrical energy accumulator 11 and be used by the heating aggregate to warm up the internal combustion engine 1 to within admissible temperature limits, so that the energy not needed at the drive output 3 is used for thermal purposes to warm up the internal combustion engine, namely as heating power which is thermally stored in the mass of the internal combustion engine 1.

If the auxiliary power takeoff 8 is an air-conditioning unit that serves to warm up or cool down a passenger compartment, energy not needed at the drive output 3 can bypass the electrical energy accumulator 11 and be used by the air-conditioning unit to warm or cool the passenger compartment within admissible temperature limits, so that the energy not needed at the drive output 3 is used in the passenger compartment, namely stored thermally.

Accordingly, an insight of the present invention is that a drive-train with a hybrid drive unit and an auxiliary power takeoff, which can be operated with variable energy demand without functional impairment within functional capability limits that depend on the auxiliary power takeoff, can be operated efficiently in that, depending on the operating status of the hybrid drive unit and/or depending on the operating status of the electrical energy accumulator and/or depending on the operating status of the auxiliary power takeoff, energy not required at the drive output 3 as drive power can bypass the electrical energy accumulator 11 and can be stored in an auxiliary power takeoff 7 and/or 8. In this way the electrical energy accumulator 11 is operated in a more protective manner since the energy passing through it is reduced.

Furthermore, this results in a virtual enlargement of the storage capacity of the electrical energy accumulator 11, since excess energy not needed as drive power can be stored not only in the electrical energy accumulator 11 itself, but also in energy storage means of the auxiliary power takeoff aggregates 7 and/or 8. The auxiliary power takeoff aggregates have variable power demand and can be operated within admissible functional capability limits without impairment of their function. The storage of the energy that bypasses the electrical energy accumulator 11 in one or more auxiliary power takeoff aggregate(s) takes place in this case, having regard to and complying with the functional capability limits specific to the auxiliary power takeoff aggregates.

According to an advantageous further development of the present invention, depending on the current operating status of the hybrid drive unit, namely depending on the current operating status of the internal combustion engine 1 and of the electric machine 2, and/or depending on the current operating status of the electrical energy accumulator 11 and/or depending on the current operating status of the auxiliary power takeoff or of each auxiliary power takeoff, an energy balance covering the entire drive-train is determined.

On the basis of the energy balance, energy not required at the drive output 3 is stored in the electrical energy accumulator 11 and/or, bypassing the electrical energy accumulator 11, it is stored in the respective auxiliary power takeoff 7 and/or 8, so ensuring an optimum overall efficiency of the drive-train. This ensures high energy efficiency when the drive-train is operated, which takes into account the efficiency of each individual aggregate involved, i.e. that of the internal combustion engine 1 and the electric machine 2 and the electrical energy accumulator 11 and the auxiliary power takeoffs 7 and 8.

In determining the energy balance to ensure an optimal overall efficiency of the drive-train, not only are the efficiencies of the aggregates involved taken into account, but rather, also the storage capacities and condition parameters of the respective energy stores and the existing degrees of freedom and functional capability limits of the respective auxiliary power takeoffs. Preferably, energy is stored in whichever energy store can store the currently available energy in the most efficient manner, as viewed over the drive-train as a whole.

By virtue of the energy balance determined, to achieve optimum overall efficiency of the drive-train it is possible, for example, to increase a load operating point of the internal combustion engine, namely if the energy balance shows that increasing the load operating point of the internal combustion engine would increase the overall efficiency of the drive-train.

When a load operating point is increased, excess energy supplied by the internal combustion engine 1 can be used for charging the various energy storage means present.

Furthermore, on the basis of the energy balance determined it is possible, for example at high driving speeds of the drive-train, to supply no additional energy to the auxiliary power takeoff, again within admissible functional capability limits of the auxiliary power takeoff concerned, in order thereby to intensify the discharging of the energy store of the auxiliary power takeoff and so to provide storage capacity in the energy store for the braking energy to be expected at high driving speeds, which is transformed into electrical energy by recuperation. In this way electrical energy produced by recuperation, for example during braking, can bypass the electrical energy accumulator 11 and be used, for example by the auxiliary power takeoff 7 to increase the working pressure in the hydraulic reservoir 14 by means of the hydraulic pump 13, or by the auxiliary power takeoff 8 to lower the temperature in the refrigeration chamber 16 by activating the cooling aggregate 15. In this way, at high speeds the bypassing of the electrical energy accumulator 11 can be planned for in anticipation.

INDEXES

1 Internal combustion engine
2 Electric machine
3 Drive output
4 Transmission
5 Clutch
6 Clutch
7 Auxiliary power takeoff on the transmission side
8 Auxiliary power takeoff on the drive aggregate side
9 Fuel tank
10 Mass of the vehicle
11 Electrical energy accumulator
12 Intermediate circuit
13 Hydraulic pump
14 Hydraulic energy store
15 Cooling aggregate
16 Thermal energy store

The invention claimed is:

1. A method of operating a drive-train of a motor vehicle, the drive-train comprising a drive aggregate having a hybrid drive unit with an internal combustion engine and an electric machine, an electrical energy accumulator that is chargable when the electric machine of the hybrid drive unit operates as a generator and is dischargable when the electric machine of the hybrid drive unit operates as a motor, a transmission connected between the hybrid drive unit and a drive output, and at least one auxiliary power takeoff coupled to the drive aggregate such that the at least one auxiliary power takeoff being operable with variable energy demand within functional capability limits that depend on the at least one auxiliary power takeoff, depending on at least one of a current operating status of the hybrid drive unit, a current operating status of the electrical energy accumulator and a current operating status of the at least one auxiliary power takeoff, the method comprising the steps of:

balancing energy for the drive train as a whole, via operation of an electric intermediate circuit, based upon an efficiency of each of the internal combustion engine, the electric machine, the electrical energy accumulator and the at least one auxiliary power takeoff, and a storage capacity and condition parameters of the energy accumulator and functional capability limits of the at least one auxiliary power takeoff such that the electric intermediate circuit at least one of:
storing a portion of energy not required at the drive output in the electrical energy accumulator, and
directing a portion of energy, not required at the drive output, to bypass the electrical energy accumulator and converting the portion of the energy, not required at the drive output, and storing the converted energy in an auxiliary power takeoff energy store to achieve an optimum overall efficiency of the drive-train, and the at least one auxiliary power takeoff is one of a heating and a cooling aggregate, and the energy not needed at the drive output bypassing the electrical energy accumulator and being used by the one of the heating and the cooling aggregate for one of heating and cooling one of the internal combustion engine and a passenger compartment to within admissible temperature limits so as to utilize the energy, not needed at the drive output, as thermal energy.

2. The method according to claim 1, further comprising the step of the one of the heating and the cooling aggregate is a heating aggregate that warms up the internal combustion engine, and the energy not needed at the drive output bypassing the electrical energy accumulator and being used by the heating aggregate for warming up the internal combustion engine to within admissible temperature limits so as to utilize the energy, not needed at the drive output, as thermal energy for warming up the internal combustion engine.

3. The method according to claim 1, further comprising the step of the one of the heating and the cooling aggregate is an air-conditioning unit that either warms up or cools down the passenger compartment, the energy not needed at the drive output bypassing the electrical energy accumulator and being used by the air-conditioning unit for either warming up or cooling down the passenger compartment to within admissible temperature limits so as to utilize the energy, not needed at the drive output, in the passenger compartment.

4. The method according to claim 1, further comprising the step of the at least one auxiliary power takeoff is either a hydraulically or a pneumatically actuated auxiliary power takeoff, and the energy not needed at the drive output bypassing the electrical energy accumulator and being used to increase a working pressure to within admissible pressure limits in either a hydraulic reservoir or a pneumatic reservoir.

5. A method of operating a drive-train of a motor vehicle, the drive-train comprising a drive aggregate having a hybrid drive unit with an internal combustion engine and an electric machine, an electrical energy accumulator that is chargable when the electric machine of the hybrid drive unit operates as a generator and is dischargable when the electric machine of the hybrid drive unit operates as a motor, a transmission connected between the hybrid drive unit and a drive output, and at least one auxiliary power takeoff on at least one of a transmission side and a drive aggregate side such that the at least one auxiliary power takeoff operable with variable energy demand within functional capability limits that depend on the at least one auxiliary power takeoff, depending on at least one of a current operating status of the hybrid drive unit, a current operating status of the electrical energy accumulator and a current operating status of the at least one auxiliary power takeoff, the method comprising the steps of:

balancing energy for the drive train as a whole, via operation of an electric intermediate circuit, based upon an efficiency of each of the internal combustion engine, the electric machine, the electrical energy accumulator and the at least one auxiliary power takeoff, and a storage capacity and condition parameters of the energy accumulator and functional capability limits of the at least one auxiliary power takeoff such that the electric intermediate circuit at least one of:

storing a portion of energy not required at the drive output in the electrical energy accumulator, and directing a portion of energy, not required at the drive output, to bypass the electrical energy accumulator and converting the portion of the energy, not required at the drive output, and storing the converted energy in an auxiliary power takeoff energy store to achieve an optimum overall efficiency of the drive-train, and the at least one auxiliary power takeoff being a cooling aggregate that cools a refrigeration chamber, and the energy not needed at the drive output bypassing the electrical energy accumulator and being used by the cooling aggregate for cooling down the refrigeration chamber to within admissible temperature limits so as to store the energy, not needed at the drive output, as thermal energy in the refrigeration chamber.

6. A method of operating a drive-train of a motor vehicle, the drive-train comprising a drive aggregate having a hybrid drive unit with an internal combustion engine and an electric machine, an electrical energy accumulator that is chargable when the electric machine of the hybrid drive unit operates as a generator and is dischargable when the electric machine of the hybrid drive unit operates as a motor, a transmission connected between the hybrid drive unit and a drive output, and at least one auxiliary power takeoff on at least one of a transmission side and a drive aggregate side such that the at least one auxiliary power takeoff operable with variable energy demand within functional capability limits that depend on the at least one auxiliary power takeoff, depending on at least one of a current operating status of the hybrid drive unit, a current operating status of the electrical energy accumulator and a current operating status of the at least one auxiliary power takeoff, the method comprising the steps of:

balancing energy for the drive train as a whole, via operation of an electric intermediate circuit, based upon an efficiency of each of the internal combustion engine, the electric machine, the electrical energy accumulator and the at least one auxiliary power takeoff, and a storage capacity and condition parameters of the energy accumulator and functional capability limits of the at least one auxiliary power takeoff such that the electric intermediate circuit at least one of:

storing a portion of energy not required at the drive output in the electrical energy accumulator, and directing a portion of energy, not required at the drive output, to bypass the electrical energy accumulator and converting the portion of the energy, not required at the drive output, and storing the converted energy in an auxiliary power takeoff energy store to achieve an optimum overall efficiency of the drive-train, and the at least one auxiliary power takeoff being a cooling fan that cools an internal combustion engine, and the energy not needed at the drive output bypassing the electrical energy accumulator and being used by the cooling fan for cooling the internal combustion engine to within admissible temperature limits so as to utilize the energy, not needed at the drive output, as thermal energy for cooling the internal combustion engine.

7. A method of operating a drive-train of a motor vehicle, the drive-train comprising a drive aggregate having a hybrid drive unit with an internal combustion engine and an electric machine, an electrical energy accumulator that is chargable when the electric machine of the hybrid drive unit operates as a generator and is dischargable when the electric machine of the hybrid drive unit operates as a motor, a transmission connected between the hybrid drive unit and a drive output, and at least one auxiliary power takeoff on at least one of a transmission side and a drive aggregate side such that the at least one auxiliary power takeoff operable with variable energy demand within functional capability limits that depend on the at least one auxiliary power takeoff, depending on at least one of a current operating status of the hybrid drive unit, a current operating status of the electrical energy accumulator and a current operating status of the at least one auxiliary power takeoff, the method comprising the steps of:

balancing energy for the drive train as a whole, via operation of an electric intermediate circuit, based upon an efficiency of each of the internal combustion engine, the electric machine, the electrical energy accumulator and the at least one auxiliary power takeoff, and a storage capacity and condition parameters of the energy accumulator and functional capability limits of the at least one auxiliary power takeoff such that the electric intermediate circuit at least one of:

storing a portion of energy not required at the drive output in the electrical energy accumulator, and directing a portion of energy, not required at the drive output, to bypass the electrical energy accumulator and converting the portion of the energy, not required at the drive output, and storing the converted energy in an auxiliary power takeoff energy store to achieve an optimum overall efficiency of the drive-train; and increasing a load operating point of the internal combustion engine based of an energy balance.

8. The method according to claim 7, further comprising the step of, at high driving speeds within the functional capability limits of the at least one auxiliary power takeoff, preventing supply of further energy to the at least one auxiliary power takeoff concerned based on the energy balance.

9. A method for operating a drive-train of a motor vehicle, the drive-train comprising a hybrid drive unit with an internal combustion engine and an electric machine, an electrical energy accumulator that is chargable when the electric machine operates as a generator and dischargable when the electric machine operates as a motor, a transmission that is connected between the hybrid drive unit and a drive output, and at least one auxiliary power takeoff connected to at least one of the transmission and the hybrid drive, the at least one auxiliary power takeoff is operated with a variable energy demand within functional capability limits that depend on the at least one auxiliary power takeoff, depending on a current operating status of at least one of the hybrid drive unit, the electrical energy accumulator and the at least one auxiliary power takeoff, the method comprising the steps of:

balancing enemy for the drive train as a whole, via operation of an electric intermediate circuit, based upon at least one of an efficiency of the internal combustion engine, an efficiency of the electric machine, an efficiency of the electrical energy accumulator, an efficiency of the at least one auxiliary power takeoff, and storage capacity and condition parameters of the energy accumulator and functional capability limits of the at least one auxiliary power takeoff such that the electric intermediate circuit at least one of:

storing a portion of energy that is not required at the drive output in the electrical energy accumulator, and directing a portion of energy that is not required at the drive output to bypass the electrical energy accumulator and converting and storing the portion of the energy that is not required at the drive output in an auxiliary power takeoff energy store; and the at least one auxiliary power takeoff being either a hydraulically or a pneumatically actuated auxiliary power takeoff, and the energy not needed at the drive output bypassing the electrical energy accumulator and being used to increase a working pressure to within admissible pressure limits in either a hydraulic reservoir or a pneumatic reservoir.

* * * * *